J. J. BUCHER.
DRIVING CHAIN.
APPLICATION FILED MAR. 31, 1917.

1,258,183.

Patented Mar. 5, 1918.

Inventor
Johann Joseph Bucher,
By
Atty.

UNITED STATES PATENT OFFICE.

JOHANN JOSEPH BUCHER, OF ZURICH, SWITZERLAND.

DRIVING-CHAIN.

1,258,183.  Specification of Letters Patent.  Patented Mar. 5, 1918.

Application filed March 31, 1917. Serial No. 158,934.

*To all whom it may concern:*

Be it known that I, JOHANN JOSEPH BUCHER, a citizen of the Republic of Switzerland, residing at Zurich, Switzerland, have invented certain new and useful Improvements in Driving-Chains; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

This invention relates to driving chains for chain wheels with annular rims acting as bearing surfaces for the chain links.

The main object of this invention is to provide a driving chain of the class referred to having highly resilient links and adapted to transmit relatively great forces.

A further object of this invention is to provide means effecting in a very simple manner a reliable lubrication of the driving chain.

The driving chain according to this invention is characterized by the feature, that each chain link consists of a steel band wound several times upon itself or of several rings placed in a concentric manner within each other.

The lubrication is thereby effected according to this invention by porous bodies impregnated with a lubricant and inserted into the hollow spaces confined by the chain links, said bodies being kept in the proper position by the springy action of the links.

Constructions according to this invention are illustrated by way of example in the accompanying drawing, in which:

Figure 1 is a side view,

Fig. 2 a corresponding plan view of the chain and a chain wheel coöperating therewith;

Figure 5:
Fig. 5 shows in perspective on a larger scale a link or shackle of this chain.
Figure 6:
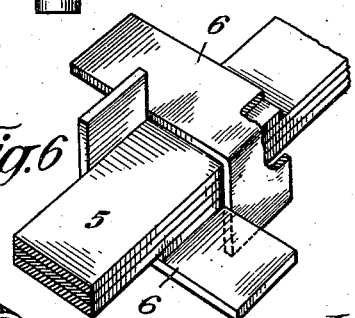
Fig. 6 shows also in perspective and on still a larger scale a detail of this link.

1 denotes a chain wheel having for instance five rims of teeth 2. 5 denotes the links or shackles of this chain coöperating with this wheel 1. Each of these shackles 5 consists of a steel band. These steel bands are cut in a suitable machine to pieces of equal length, which are then rolled or wound over in several layers for instance over a mandrel of suitable shape. The ends of these steel bands can then be held fast in the manner required by means of one or more transverse strips 6 or the like. In the present case, to each end of the steel band 5 is welded a short metal strip 6 at a right angle to the steel band, one edge of the said strip being flush with one end of the band. The steel band 5 is then wound upon itself, so that its two ends which are also separated from each other by a certain thickness of material, are situated in the longitudinal direction of the shackle at a distance apart equal to the width of the two metal strips 6 (Fig. 6). After the winding of the band 5, the said strips 6 which are then situated side by side, are bent in the manner shown in Fig. 6 about the coiled band until they surround it as shown in Fig. 5. Shackles made of such steel bands 5 have a great resiliency, so that by means of the same a perfectly springy movement of the chain over the wheel is insured, without any wear of the shackles.

Figure 1:
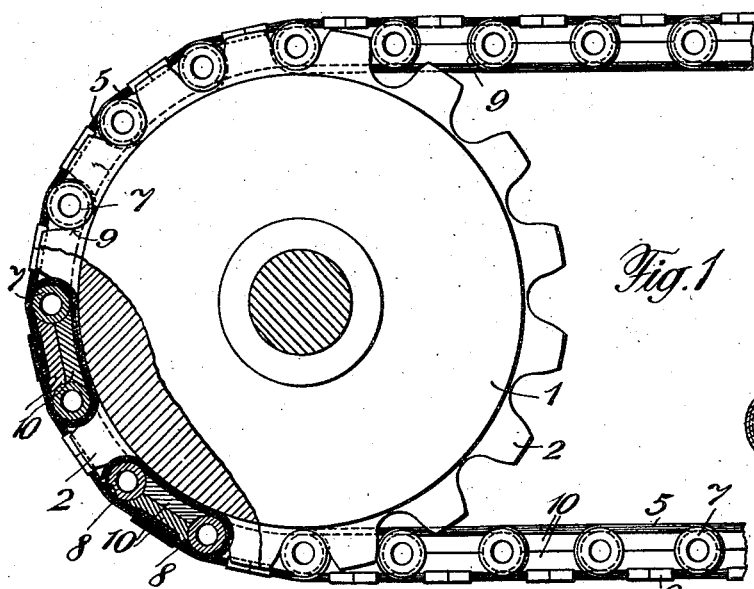
Figure 7:
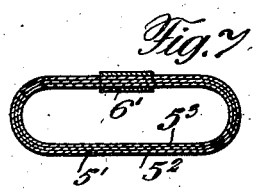
Fig. 7 is a longitudinal section through a second form of such a link or shackle.
Figure 2:
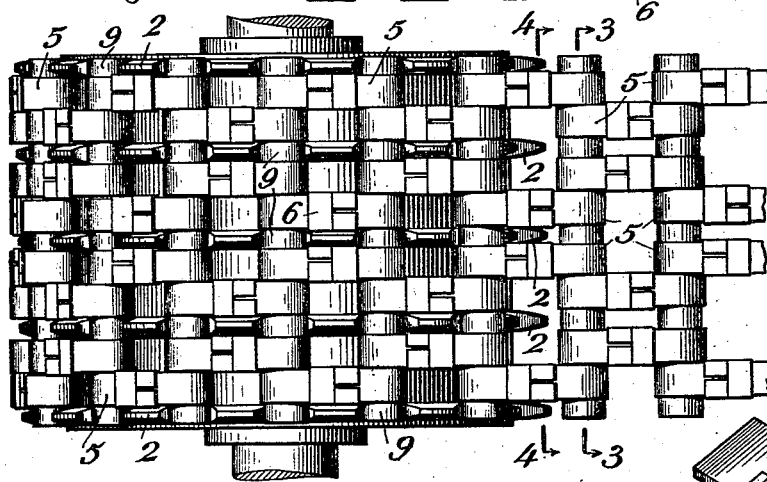

Instead of making the shackles from a steel band rolled up, each of the same could be constituted by several resilient elongated loops $5'$, $5^2$, $5^3$ placed within each other and connected together by a transverse strip $6'$ or the like (Fig. 7).

Figure 3:
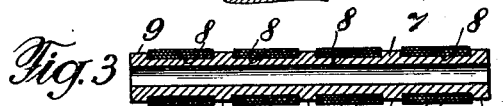
Fig. 3 is a section on the line 3—3 of Fig. 2.
Figure 4:
Fig. 4 is a section on the line 4—4 of Fig. 2.

The shackles 5 having semi-circular ends are placed over connecting pins 7 provided with four annular recesses 8 (Fig. 3) adapted to receive said ends of the shackles. The width of each recess 8 corresponds to the double width of a shackle 5. Each pin 7, which is preferably made hollow, has five annular collars 9 coöperating with the teeth 2 of the chain wheel 1. When such a driving chain is placed over the chain wheel 1 the shackles 5 arranged in pairs side by side fit closely to the flat parts of the circumference of this wheel 1 as soon as the chain is exposed to traction, the collars 9 of pins 7 engaging thereby with the spaces between the teeth 2.

The number of toothed rims and the number of the pairs of shackles coöperating with a pin 7 may vary to suit the condition of each case. Thus, also less or more than five toothed rims may be provided, should it not be preferred to provide two or more chain wheels arranged side by side, and also more than four pairs of shackles may coöperate with each pin 7.

For the purpose of securing a very reliable lubrication of the driving chain I provide in the hollow space of each shackle 5 two felt pieces 10 fitting closely to the inner surface of the shackle and to the pins 7 coöperating with this shackle. The felt pieces 10 are impregnated with a lubricant, such as oil, which during the springy traveling of the chain links over the chain wheel is then just squeezed out to the amount required for a proper lubrication.

These lubricating means provide for a reliable lubrication of all coöperating parts and they have the great advantage, that they do not require hardly any attendance.

A chain of links formed as above described has other advantages, over known chains, in that they have a springy movement in traveling, and owing to the light weight of the shackles and their inherent resiliency and ability to bind, they fit closely to the circumference of the chain wheel when subjected to traction and are consequently noiseless.

What I claim is:

1. A drive chain link consisting of a flat spring metal band wound upon itself in the form of an elongated loop.

2. A drive chain link consisting of a flat spring metal band wound upon itself in the form of an elongated loop, and means connecting the ends of the band to the loop.

3. A drive chain link consisting of a flat spring metal band wound upon itself in the form of an elongated loop, and a transverse strip connected to each end of the band and surrounding the superposed layers thereof.

4. A drive chain link consisting of a flat spring metal band wound upon itself in the form of an elongated loop, and a transverse strip connected to each end of the band and surrounding the superposed layers thereof, the ends of the band overlapping a distance equal to the combined width of the two strips.

5. A drive chain, comprising a series of resilient shackles adapted to fit in a springy manner to the annular rims of a chain wheel, each shackle consisting of a plurality of superposed layers, and means for connecting said shackles.

6. A drive chain, comprising a series of resilient shackles adapted to fit in a springy manner to the annular rims of a chain wheel, each shackle consisting of a steel band wound several times upon itself, and means for connecting said shackles.

7. A chain drive, comprising a sprocket wheel having a plurality of toothed rims and annular rim portions on the sides of the rims, shackles, each consisting of a steel band wound several times upon itself and having semi-circular ends, and connecting pins having annular recesses adapted to receive the semi-circular ends of the shackles.

In testimony that I claim the foregoing as my invention, I have signed my name.

JOHANN JOSEPH BUCHER.